United States Patent [19]
Barok

[11] 3,787,621
[45] Jan. 22, 1974

[54] TELEPHONE SET WITH TRANSMISSION BY MICROPHONE AND AMPLIFIER AND RECEPTION BY LOUDSPEAKER

[76] Inventor: Albert Barok, 36, Ave. d'estrienne d'Orves, Nice, France

[22] Filed: Aug. 6, 1971

[21] Appl. No.: 169,770

[30] Foreign Application Priority Data
Aug. 6, 1970 France .............................. 7029610

[52] U.S. Cl. .............................. 179/1 HF, 179/1 FS
[51] Int. Cl. .............................. H04m 9/08
[58] Field of Search .............................. 179/1 HF, 1 FS, 1 H

[56] References Cited
UNITED STATES PATENTS

| | | | |
|---|---|---|---|
| 3,665,106 | 5/1972 | Parshad | 179/1 A |
| 3,594,507 | 7/1971 | Clark | 179/1 FS |
| 3,046,354 | 7/1962 | Clemency | 179/1 HF |

*Primary Examiner*—Kathleen H. Claffy
*Assistant Examiner*—Douglas W. Olms
*Attorney, Agent, or Firm*—McGlew and Tuttle, P. C.

[57] ABSTRACT

A telephone set has sound transmission by a microphone and amplifier over a transmission circuit, and sound reception by loudspeaker over a reception circuit. Each circuit includes an input transformer and an output transformer, and both circuits are connected, through a telephone transformer, to the line. The telephone set includes an arrangement for preventing the Larsen effect and other interference between the two circuits. This arrangement includes respective sets of four diodes or transistors, connected as a Wheatstone bridge, each connected between an input transformer and the associated output transformer. A square wave multi-vibrator is connected in parallel to the output transformer of the transmission circuit and to the input transformer of the reception circuit, and is connected, through respective diodes or transistors to the input transformer of the transmission circuit and to the output transformer of the reception circuit. The multi-vibrator supplies alternating positive and negative square wave pulses, at a frequency very substantially higher than the frequency of the sound waves, to the two Wheatstone bridges, with one Wheatstone bridge receiving a positive square wave pulse at the same time the other Wheatstone bridge receives a negative square wave pulse. The multi-vibrator is continuously operative, and, in effect, chops the modulated currents in the two circuits at a very high frequency of the order of 0.5 MHz.

4 Claims, 1 Drawing Figure

PATENTED JAN 22 1974 3,787,621
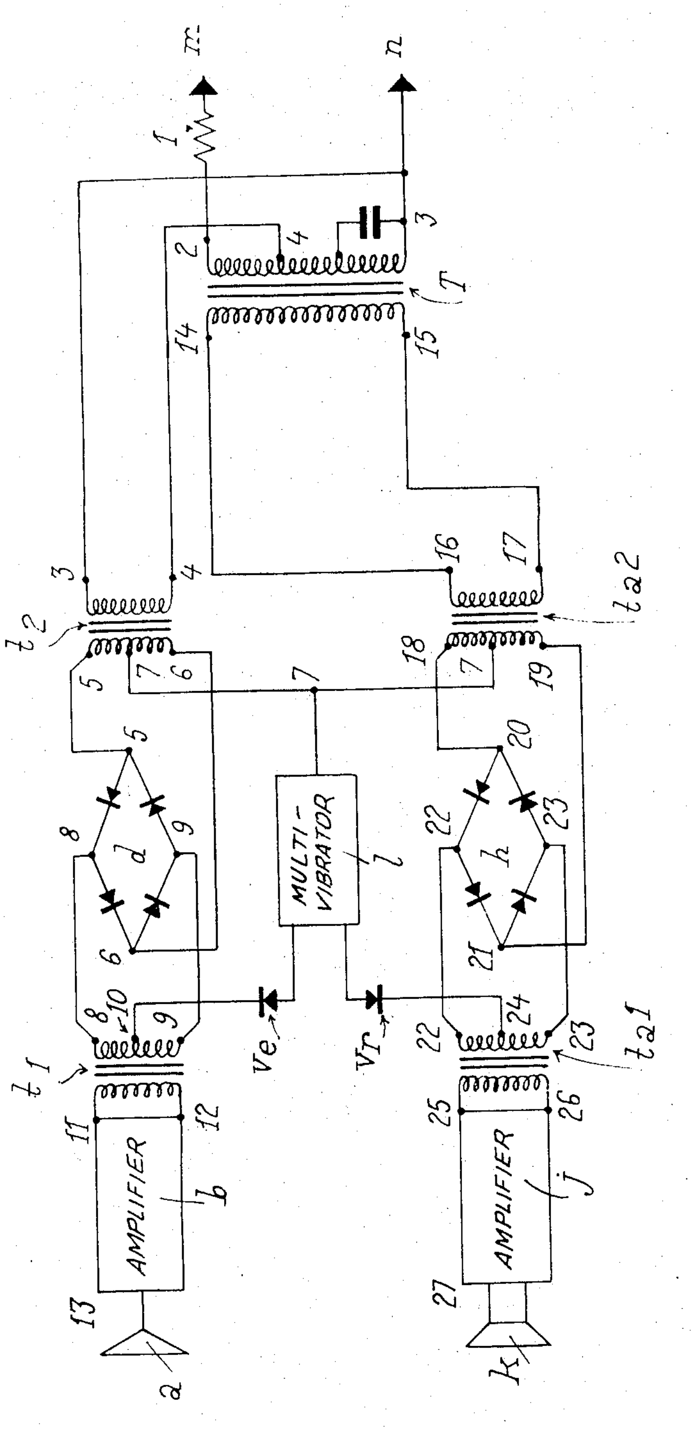
INVENTOR
ALBERT BAROK
BY
John J. McGlew
ATTORNEY

TELEPHONE SET WITH TRANSMISSION BY MICROPHONE AND AMPLIFIER AND RECEPTION BY LOUDSPEAKER

FIELD OF THE INVENTION

This invention relates to telephone sets of the type in which the caller can speat at a distance from a microphone, with his hands free, and can hear the called party's words through a loudspeaker, and, more particularly, to a novel, improved and simple arrangement for preventing the Larsen effect and other interference between the transmission and reception circuits.

BACKGROUND OF THE INVENTION

In telephone sets of the mentioned type, including both a transmitter and a receiver, one serious difficulty resides in the necessity of avoiding Larsen effects, for example, the interference effects of the transmitter and receiver circuits on each other, as well as the effect of incidental noises or of the sound of the loudspeaker on the transmission circuit. By the term "Larsen effect" is meant the troublesome oscillation occurring in a loudspeaker when a louspeaker and a microphone are placed at a small distance one from the other. It is the repercussion of the reception on the transmission, or of the output on the input, phenomenon which is self-maintained in a closed loop.

There are already known various systems in which attempts have been made to suppress this Larsen effect by blocking the transmission circuit, during operation of the receiving circuit, and vice versa. This blocking has been effected either by means of manually operated keys, or, more rationally, automatically as one or the other of the circuits comes into operation. However, automatic blocking systems using valves with multiple electrodes, which are sometimes very numerous, are very complicated, tedious to construct and require delicate adjustment. Additionally, they all have the disadvantage that blocking is effected by drawing energy from members or components connected directly or inductively with the line, and this causes interference on the line which may become a considerable nuisance.

For example, blocking is effected by means of counteractive assemblies which throttle the power valves on transmission or on reception. However, this throttling has to be suppressed when the modulated signals are transmitted in the microphone or received by the loudspeaker. This necessitates numerous valves, transformers and potentiometers, which have to be regulated to make the effect of the signals exceed that of the counteraction. Above all, the effect of one circuit on the other cannot be suppressed completely since the signal and the counteraction are in opposition. Upon reception, for example, the sound wave in the loudspeaker reverberates in the microphone and, if it is rather powerful, it interrupts the reception current, which gives rise to fading.

In another system, the inductive part of each circuit, namely the transmitter and the receiver, has two hexode valves amplifying the modulated current from either the microphone or from the line. Blocking is then effected, in the transmission circuit, by drawing part of the amplified modulated current from the output transformer secondary, rectifying the drawn output current to provide a negative potential, and then supplying this negative potential to the main grid of the reception circuit input valve, to block this valve, and to one of the secondary electrodes, so that there is fed, to the transmission input valve, a zero potential or a positive potential to maintain this valve unblocked during transmission. The arrangement of the receiving circuit is symmetrical to that of the transmission circuit. It will be noted that, in this case also, the abruptly variable energy derived from the transformer secondary has a direct or inductive action on the line.

SUMMARY OF THE INVENTION

The present invention is directed to a system which avoids all of the aforementioned disadvantages, is much simpler than the mentioned systems, uses only simple solid state elements or devices, such as diodes or transistors, and, in particular, assures blocking in a manner completely independent of the transmitting and receiving circuits, thus allowing these circuits to function freely in a normal manner without alteration, so that there is not the least effect on the line.

In accordance with the invention, each of the two circuits, namely the transmission circuit and the reception circuit, has, between its input and output transformers, a group of four diodes or transistors, arranged as a Wheatstone bridge. The diodes or transistors in one group are made conductive in alternation with the diodes or transistors in the other group, by positive pulses supplied to one group simultaneously with negative pulses supplied to the other group. These pulses are supplied continuously through two separating or isolating diodes or transistors, from a generation of pulses with a square wave multi-vibrator operating at a sufficiently high frequency that the modulated currents, thus "chopped," produce their normal effect, and for the pulses to be not audible in the loud-speaker or in the line.

It will be understood that this "chopping" of the modulated current in no way alters the form of the current, and that the blocking of one circuit while the other is conductive is, so to speak, effected by a rocker oscillating continuously at a very high speed. The successive blockings and unblockings are integral and free, and can have no reaction on each other or on the line, since they are produced by localized or isolated means having no connection with the line.

An object of the invention is to provide an improved telephone set with sound transmission by a microphone and amplifier and sound reception by loudspeaker.

Another object of the invention is to provide such a telephone set including simple means preventing the Larsen effect and other interference between the transmission and reception circuits.

A further object of the invention is to provide such a telephone set including means continuously operable to chop the modulated currents in both the transmission circuit and the reception circuit at a frequency very substantially higher than the frequency of the sound waves.

For an understanding of the principles of the invention, reference is made to the following description of a typical embodiment thereof as illustrated in the accompanying drawing.

BRIEF DESCRIPTION OF THE DRAWINGS

In the drawing, the single FIGURE is a schematic wiring diagram of a telephone set embodying the invention.

DESCRIPTION OF THE PREFERRED EMBODIMENT

Referring to the drawing, the transmission circuit includes a microphone *a*, its amplifier *b*, the differential transformer $t_1$, the Wheatstone bridge *d*, the differential transformer $t_2$, and the differential portion 3–4 of a telephone transformer T, acting as a transmission secondary. Microphone *a* is connected to the input 13 of amplifier *b*, and the primary winding of input transformer $t_1$ is connected to the output of amplifier *b* at the terminals 11 and 12. The terminals of the secondary winding of transformer $t_1$ are connected to the opposite junction points 8 and 9 of bridge *d*, and the other two opposite terminals of bridge *b* are connected to the terminals 5 and 6 of the primary winding of transformer $t_2$. Terminal 2 of telephone transformer T is connected through a resistance I to a line terminal *m*, and terminal 3 is connected directly to the other line terminal *n*.

The reception circuit has a similar arrangement, including the loudspeaker *k* connected to the output of amplifier *j* whose input terminals 25 and 26 are connected to the secondary winding of an output transformer ta1. The reception circuit further includes a Wheatstone bridge *h* and an input transformer ta2. The primary winding of transformer ta1 is connected to a pair of opposite junctions 22 and 23 of bridge *h*, and the other pair of opposite terminals 20 and 21 are connected to the terminals 18 and 19, respectively, of the secondary winding of transformer *ta*2. The terminals 16 and 17 of the primary winding of input transformer ta2 are connected, respectively, to the terminals 14 and 15 of the other winding of transformer T.

Each of the Wheatstone bridges *d* and *h* comprises four diodes or transistors, these diodes or transistors being connected with the indicated polarities.

In accordance with the invention, a square wave multi-vibrator *l* is connected to both the transmission circuit and the reception circuit. On the transmission side, a generator of pulses with a square wave, this generator *l* being connected between point 10 on the secondary winding of input transformer $t_1$ and a common point 7 connected to the midpoint of the primary winding of output transformer $t_2$. On the reception side, this generator *l* is connected, at point 7, between the midpoint of the secondary winding of input transformer *ta*2 and the midpoint 24 of the primary winding of output transformer ta1. The connection of the generator l to the points 10 and 24 is effected through isolating, diodes or transistors, $V_e$ and $V_r$, respectively.

During transmission, transformer $t_1$ supplies the modulated microphone current, amplified in amplifier *b*, to the junctions 8 and 9 of bridge *d* whose other junctions 5 and 6 supply the corresponding modulated potentials to transformer $t_2$ and thence to the line *m*, *n* through winding 3, 4 of telephone transformer T. In a similar manner, during reception, transformer ta2 supplies the modulated current from the line to the junction points

20 and 21 of bridge *h*, whose other junction points 22 and 23 supply the modulated line current to the transformer ta1 and thence to loudspeaker *k* through amplifier *j*.

During both transmission and reception, the square wave generator, constituted with the multi-vibrator *l*, continuously sends pulses to point 10 in the transmission circuit and to point 24 in the reception circuit, and these pulses are alternately positive and negative. However, the pulses supplied are always in phase opposition in the two circuits, because of the diodes or transistors $V_e$ and $V_r$, thus to block one circuit while the other circuit is conducting. The local generator *l* may operate, for example, at a frequency of the order of 0.5 MHz, with its output being converted into square pulses with the aid of a quartz crystal providing a potential of 10 volts.

While a specific embodiment of the invention has been shown and described in detail to illustrate the application of the principles of the invention, it will be understood that the invention may be embodied otherwise without departing from such principles.

What is claimed is:

1. A telephone set, with sound transmission by a microphone and amplifier over a transmission circuit and sound reception by a loudspeaker over a reception circuit, comprising, in combination, two diode gates, one in said transmission circuit and the other in said reception circuit; each diode gate including a respective input transformer, a respective output transformer, and a respective set of four diodes, arranged in a ring, connecting the respective input transformer to the respective output transformer; and a control having an input connected in common to one respective input transformer and to the other respective output transformer and having two outputs, each connected to a different respective diode gate; said control supplying two distinct series of pulses; both series being composed of identical pulses but being in phase opposition with respect to each other such that a pulse will cause a gate to conduct, and the absence of a pulse will block the conductance of the gate, whereby the diode gates are blocked and opened in alternation with each other; said control supplying said series of pulses at a frequency outside the audible range of frequencies.

2. A telephone set, as claimed in claim 1, in which said control comprises a multi-vibrator having input terminals connected, in parallel, to the midpoint of the primary winding of the output transformer of said transmission circuit and to the midpoint of the secondary winding of the input circuit of said reception circuit; said multi-vibrator having two outputs, one connected to the midpoint of the secondary winding of the input transformer of said transmission circuit and the other connected to the midpoint of the primary winding of the output transformer of said reception circuit.

3. A telephone set, as claimed in claim 2, including a respective diode connected in series between each output of said multi-vibrator and the associated transformer winding.

4. A telephone set, as claimed in claim 3, in which said multi-vibrator supplies square wave pulses.

* * * * *